United States Patent [19]

Ishikawa et al.

[11] Patent Number: 4,942,285
[45] Date of Patent: Jul. 17, 1990

[54] METHOD FOR WELDING METAL HONEYCOMB CARRIER

[75] Inventors: Hiroyuki Ishikawa; Hiroyasu Koizumi, both of Tokyo, Japan

[73] Assignee: Calsonic Corporation, Tokyo, Japan

[21] Appl. No.: 431,750

[22] Filed: Nov. 6, 1989

[51] Int. Cl.⁵ ............................................. B23K 26/00
[52] U.S. Cl. .............................. 219/121.64; 219/121.8
[58] Field of Search ..................... 219/121.63, 121.64, 219/121.78, 121.8, 121.13, 121.14, 121.12, 121.35

[56] References Cited

U.S. PATENT DOCUMENTS 3,597,579  8/1971  Lumley ............................. 219/121.6
4,205,118  5/1980  Schubert ....................... 219/121.12 X
4,802,729  2/1989  Rivoallan et al. ......... 219/121.63 X Primary Examiner—C. L. Albritton
Attorney, Agent, or Firm—Horst M. Kasper

[57] ABSTRACT

This invention relates to a method for welding a metal honeycomb carrier in which the metal honeycomb carrier for a catalyst convertor is welded. The method for welding the metal honeycomb carrier according to this invention radiates laser beam to one end surface of a core section formed of metal corrugated and flat plates to mutually weld said corrugated and flat plates, where said laser beam is moved in the direction perpendicular to the welding direction while oscillating at a certain amplitude and masking is applied to the amplitude end of said laser beam and its neighboring area on the end surface of said core section.

12 Claims, 3 Drawing Sheets

METHOD FOR WELDING METAL HONEYCOMB CARRIER

BACKGROUND OF THE INVENTION

1. Field of the Invention

This invention relates to a method for welding a metal honeycomb carrier in which the metal honeycomb carrier for a catalyst convertor is welded.

2. Description of the Prior Art

Generally, to clean automobile exhaust, the automobile exhaust system is provided with a metal honeycomb carrier as disclosed in the Japanese Patent Application Laid-open No. 54-13462.

FIG. 7 shows the details of such a metal honeycomb carrier. This metal honeycomb carrier is formed by alternatively piling metal corrugated plate 11 and flat plate 13 and rolling the piled plates into a multiple form with a core material at the center, thereby providing a core section 17.

In this core section 17, when the corrugated plate 11 and the flat plate 13 are kept as rolled, flow of exhaust into the core section 17 causes the corrugated plate 11 and the flat plate 13 arranged at the center of the core section 17 to protrude in the axial direction of the core section 17, causing so-called film out phenomenon. To remedy this, the corrugated plate 11 and the flat plate 13 are mutually welded after the core section 17 is formed.

FIG. 8 shows one example of existing methods for welding a metal honeycomb carrier. In this method, with one end surface 19 of the core section 17 upside, laser beam 23 is radiated to the end surface 19 from a welding head 21 which is disposed above the end surface 19. The welding head 21 is moved in the radial direction of the core section 17 to weld the corrugated plate 11 and the flat plate 19 at the end surface 19 which is exposed to the laser beam 23.

But, in this conventional method of welding the honeycomb carrier, to weld with the laser beam 23 focused on the end surface 19 of the core section 17, the laser beam 23 spotted on the end surface 19 has a small diameter of about 0.2 mm for example. Therefore, to weld the plates with 2-mm width of 2 mm, the welding head 21 must go and return 5 times, entailing a disadvantage of consuming a great time for welding.

To remedy this disadvantage, the end surface 19 of the core section 17 is approached to the welding head 21 from the focal point of the laser beam 23 so as to be welded with the laser beam 23 having relatively greater diameter. But, the power density differs between the center and peripheral portions of the laser beam 23, resulting in causing a drawback that it is difficult to uniformly weld the end surface 19.

SUMMARY OF THE INVENTION

The present invention aims to remedy the above disadvantages and to provide a method for welding a metal honeycomb carrier in which corrugated and flat plates can be mutually welded quickly and securely.

DESCRIPTION OF THE PREFERRED EMBODIMENT OF THE INVENTION

The present invention will be described by examples in detail with reference to the drawings.

Figure 1:
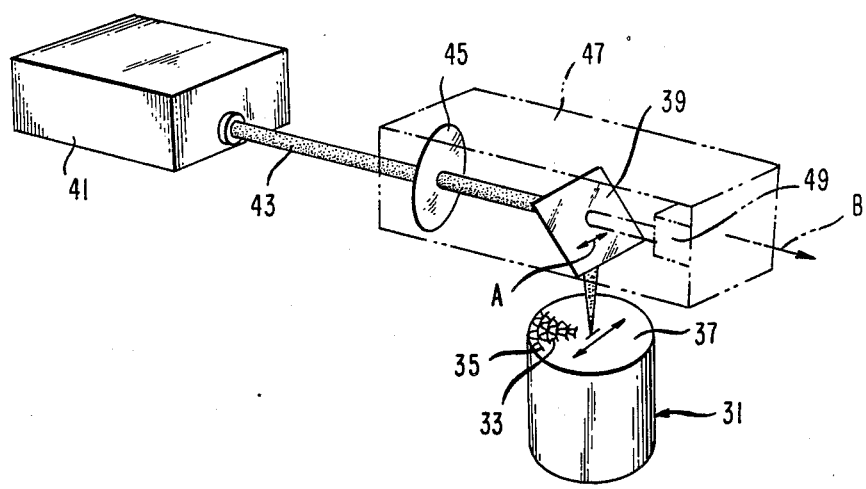
FIG. 1 is a perspective view showing one embodiment of the welding device for metal honeycomb carrier to enforce this invention.

FIG. 1 shows a welding device for metal honeycomb carrier to enforce one embodiment of the method according to this invention, wherein reference numeral 31 shows a core section which is formed by piling a stainless steel corrugated plate 33 and flat plate 35 and coiling them in multiple.

The stainless steel here used consists of Cr of 19.0–21.0 wt %, Al of 4.5–5.5 wt %, REF (Ce, La, etc.) of 0.001–0.1 wt %, C of 0.01 wt % or below, and the balance of F. And it has thickness of 50 um. And the corrugated plate 33 has a distance of 2.56 mm between its ridges (or grooves) and height of 1.24 mm from the groove to the ridge; and the radius at the top of ridge and groove is 0.5.

This core section 31 is disposed with its end surface 37 upside, and a total reflection mirror (oscillating mirror) 39 above the end surface 37.

This total reflection mirror 39 receives laser beam 43 from a $CO_2$ gas laser generator 41 through a condensing lens 45.

The total reflection mirror 39 and the condensing lens 45 are accommodated in a welding head 47, which has an oscillating device 49 disposed to oscillate the total reflection mirror 39 in the arrow direction A shown in FIG. 1.

In the device for welding the metal honeycomb carrier configured as described above, the laser beam 43 generated from the laser generator 41 is condensed with the condensing lens 45, lead to the total reflection mirror 39, reflected thereon, and radiated to the end surface 37 of the core section 31. The welding head 47 is moved at a certain speed in the arrow direction B when the laser beam 43 is oscillated.

Figure 2:
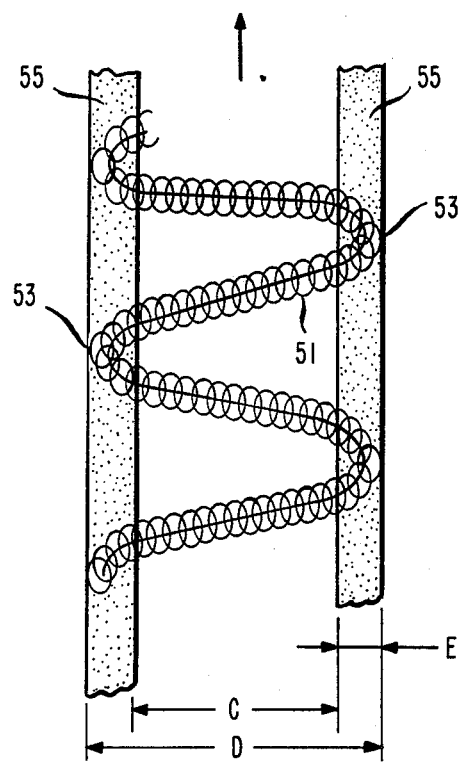
FIG. 2 is an explanatory view showing the trace of the laser beam.

And in the present device, since the total reflection mirror 39 is oscillated with the oscillating device 49, the trace of the laser beam 43 radiated on the end surface 37 of the core section 31 forms a zigzag curve 51 as shown in FIG. 2.

Where the trace of the laser beam 43 forms the zigzag curve 51, an energy supply amount per unit time at an amplitude end 53 becomes extremely great as compared with that at the center section C, resulting in causing so-called burn through on the corrugated plate 33 or flat plate 35 positioned at the amplitude end 53.

Thus, the occurrence of burn through on the corrugated plate 33 or flat plate 35 clogs the metal honeycomb carrier, increasing the exhaust resistant of the metal honeycomb carrier against the exhaust.

In the method of the present invention, therefore, the amplitude end 53 and its neighbor of the laser beam 43 on the end surface 37 of the core section 31 are masked with masking material 55 which reflects the laser beam 43.

This masking is effected by attaching the masking material 55 in a pair at a certain interval on the end surface 37 of the core section 31.

To practice the method of this invention, for example in FIG. 2, when the output of the $CO_2$ gas laser generator 41 is about 1,000 W and the amplitude D of the laser beam 43 is 2 mm to 30 mm, the oscillating frequency by means of the oscillating device 49 is desirably 120–150 Hz. And the masking is preferably effected to cover a distance E of at least 0.3 mm inside from the amplitude end 53.

In the method of the present invention, the laser beam 43 is designed to move in the vertical direction with respect to the welding direction at the certain amplitude D, so that if the diameter of the laser beam 43 on the end surface 37 of the core section 31 is as small as about 0.2 mm for example, welding can be done with a width substantially corresponding to the amplitude D of the laser beam 43, thereby surely being able to weld the corrugated plate 33 and the flat plate 35.

In the method of this invention, the amplitude end 53 and its neighbor of the laser beam 43 on the end surface 37 of the core section 31, or the section which receives extremely great energy supply per unit time is masked with the masking material 55, thereby surely being able to prevent the burn through on the corrugated plate 33 or flat plate 35 exposed at the position of the amplitude end 53.

In the above embodiment, the masking material 55 is directly applied to the end surface 37 of the core section 31. But this invention is not limited to the above embodiment. For example, an appropriate masking material may be well disposed on the way of the laser beam 43 from the welding head 47.

In the above embodiment, the condensing lens 45 is disposed between the laser generator 41 and the total reflection mirror 39. But, the method of this invention is not limited to that embodiment. It is naturally possible to arrange the condensing lens 45 between the total reflection mirror 39 and the core section 31.

In the above embodiment, the condensing lens 45 and the total reflection mirror 45 are independently arranged within the welding head 47. But the method of this invention is not limited to that arrangement. For example, using so-called R lens which integrally consists of a condensing mirror and a total reflection mirror is effective to oscillate this R lens.

Generally, welding depends on an energy charging amount per unit area and unit time. Therefore, the welding condition may be adjusted to meet the amplitude end to which the laser beam energy is concentrated without masking the amplitude end and its neighbor of the laser beam, determining the amplitude to 2–3 mm and oscillating the laser beam perpendicular to the welding direction at a certain amplitude, thereby effecting the welding. In this case, welding is effected at both amplitude ends only.

Figure 3:
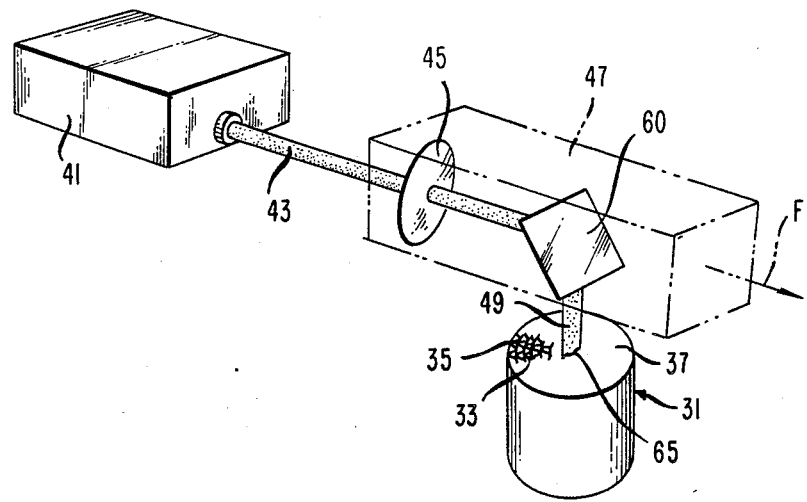
FIG. 3 is a perspective view showing one embodiment of the welding device for metal honeycomb carrier to enforce this invention.

FIG. 3 shows a device for welding the metal honeycomb carrier to conduct another embodiment of the method according to this invention, where the structure is same with that of the device in the embodiment shown in FIG. 1 except that a condensing member 60 is different. Therefore, the same reference numerals as in the above embodiment are used for the same elements.

The core section 31 is disposed with the end surface 37 upside, and the condensing member 60 is disposed above the end surface 37.

The laser beam 43 is lead to the condensing member 60 from the laser generator 41 through the condensing lens 45.

The condensing member 60 and the condensing lens 45 are accommodated in the welding head 47, which is freely movable in the arrow direction C.

Figure 4:
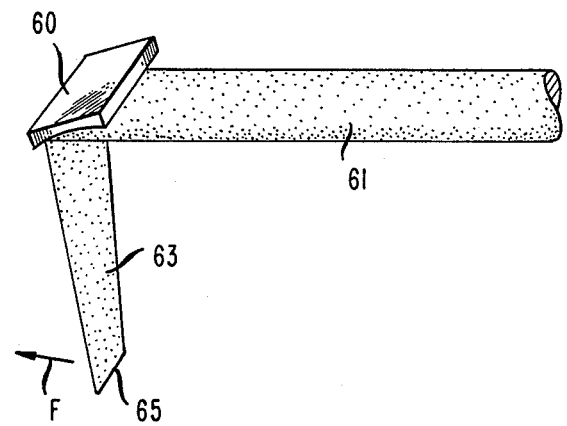
FIG. 4 is an explanatory view showing a condensing member.

The condensing member 60 in this embodiment is formed of a cylindrical concave mirror as shown in FIG. 4, and works to reflect cylindrical laser beam 61 from the condensing lens 45 at an angle of 90° and also convert this laser beam 61 into a linear beam 63.

The condensing member 60 is disposed in the welding head 47 so that an axis 65 of the cross section of the linear beam 63 is perpendicular to the moving direction F of the welding head 47.

With the device for welding the metal honeycomb carrier configured as described above, the laser beam 43 generated from the laser generator 41 is condensed through the condensing lens 45, lead to the condensing member 60, reflected on the condensing member 60, and at the same time converted into the linear beam 63, and radiated onto the end surface 37 of the core section 31. And the welding head 47 is moved at a certain speed in the arrow direction F as shown in FIG. 3 when the laser beam 61 is generated.

According to the method of the present invention, the laser beam 61 is converted into the linear beam 63 with the condensing member 60 and radiated onto the end surface 37 of the core section 31. The welding width can be made extensively broader than before by setting the axis 51 of the linear beam 63 to be perpendicular to the moving direction C of the welding head 47. Thus the corrugated plate 33 and the flat plate 35 can be mutually welded quickly and securely.

The linear beam 63 produced by the condensing member 60 is capable of welding uniformly because the power densities at the center and the peripheral area have a very small difference.

More specifically, in the method of the present invention, even if the diameter of the laser beam 61 condensed by the condensing lens 45 is for example as small as about 0.2 mm, welding can be substantially done on the corrugated plate 33 and the flat plate 35 quickly and securely with width corresponding to the length of the axis 65 of the linear beam 63.

Figure 5:
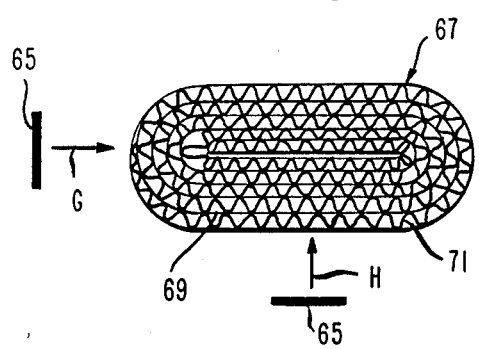
FIG. 5 is an explanatory view showing an ellipse core section.

The above embodiment describes an example of applying the method of this invention to the cylindrical core section 31. To apply the method of this invention to an ellipse core section 67 as shown in FIG. 5, moving the welding head 47 in parallel with the linear side of the flat plate 69 as shown by an arrow G allows more uniform welding.

Specifically, as indicated by the arrow H, to weld from the position perpendicular to the flat plate 69, the linear beam 63 may have a state to spot on the corrugated plate 71 or flat plate 69 only. Therefore, the burn through of the flat plate 69 becomes relatively greater than the corrugated plate 71 but, welding in parallel to the longitudinal direction the flat plate 69 results in producing uniform burn through because the linear beam 63 is always in a state to straddle the corrugated plate 71 and the flat plate 69.

Figure 6:
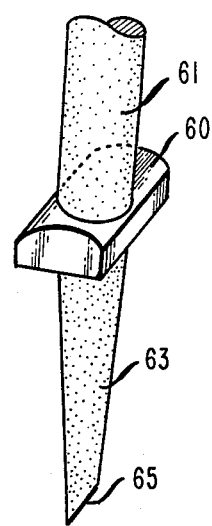
FIG. 6 is an explanatory view showing another condensing member.
Figure 7:
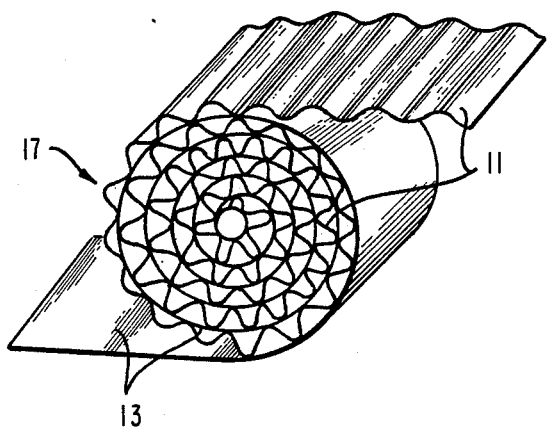
FIG. 7 is a perspective view showing a condition that corrugated and flat plates are rolled.
Figure 8:
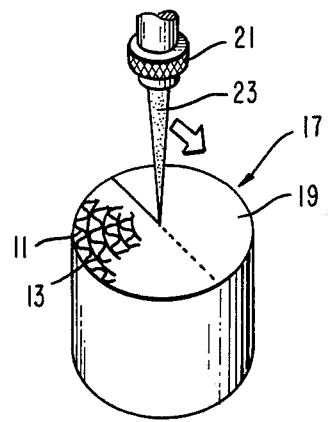
FIG. 8 is a perspective view showing a conventional method for welding metal honeycomb carrier.

FIG. 6 shows another condensing member used in this method of the invention. This condensing member 60 consists of a cylindrical convex lens and can convert the cylindrical laser beam 61 into the linear beam 63 by passing the laser beam 61 through it.

In the above embodiment, the condensing lens 45 is arranged between the laser generator 41 and the condensing member 39. But the method of this invention is not limited to that embodiment. It is naturally true that the condensing lens 45 may be disposed between the condensing member 60 and the core section 31.

And also in the above embodiment, the axis 65 of the linear beam 63 is set in the direction perpendicular to the moving direction of the welding head 47. But the method of this invention is not limited to that embodiment. It is naturally true that the axis 65 of the linear beam 63 is tilted toward the moving direction of the welding head 47.

Further in the above each embodiment, a method for welding a metal honeycomb carrier where the flat plate and the corrugated plate are rolled. This method can be also applied to welding of a metal honeycomb carrier which is of a type forming the core section by laminating the flat plate and the corrugated plate.

The present invention is not limited to the specific embodiments excepting for these restriction in the attached claims because much broader embodiments can be configured without departing from the spirit and scope of this invention.

What is claimed is:

1. A method for welding a metal honeycomb carrier by radiating laser beam to one end surface of a core section formed of metal corrugated and flat plates to mutually weld said corrugated and flat plates, said method comprising:
    moving said laser beam in the direction perpendicular to the welding direction while oscillating at a certain amplitude and
    masking the amplitude end of said laser beam and its neighboring area on the end surface of said core section.

2. A method for welding a metal honeycomb carrier according to claim 1, wherein the core section is formed by piling the metal corrugated and flat plates and rolling them into a multiple layer.

3. A method for welding a metal honeycomb carrier according to claim 1, wherein the core section is formed by piling the metal corrugated and flat plates into a multiple layer.

4. A method for welding a metal honeycomb carrier according to claim 1, wherein the amplitude is 2 mm to 30 mm.

5. A method for welding a metal honeycomb carrier according to claim 2, wherein frequency is 120 Hz to 150 Hz.

6. A method for welding a metal honeycomb carrier according to claim 1, wherein masking is effected to cover a distance of at least 0.3 mm inward from the amplitude end.

7. A method for welding a metal honeycomb carrier by radiating laser beam generated from a laser generator to one end surface of a core section formed of metal corrugated and flat plates to mutually weld said corrugated and flat plates, said method comprising:
    converting said laser beam into a linear beam through a condensing member and
    radiating the beam to the end surface of said core section.

8. A method for welding a metal honeycomb carrier according to claim 7, wherein the condensing member is a cylindrical concave mirror.

9. A method for welding a metal honeycomb carrier according to claim 7, wherein the condensing member is a cylindrical convex lens.

10. A method for welding a metal honeycomb carrier according to claim 7, wherein the core section is formed by piling the metal corrugated and flat plates and rolling them into a multiple layer.

11. A method for welding a metal honeycomb carrier according to claim 7, wherein the core section is formed by piling the metal corrugated and flat plates and laminating them into a multiple layer.

12. A method for welding a metal honeycomb carrier according to claim 7, wherein frequency is 120 Hz to 150 Hz.

* * * * *